(12) United States Patent  
Lambert

(10) Patent No.: US 8,781,112 B2  
(45) Date of Patent: Jul. 15, 2014

(54) SIGNED MONTGOMERY ARITHMETIC

(75) Inventor: Robert J. Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 529 days.

(21) Appl. No.: 12/260,865

(22) Filed: Oct. 29, 2008

(65) Prior Publication Data

US 2009/0268900 A1    Oct. 29, 2009

Related U.S. Application Data

(60) Provisional application No. 60/984,851, filed on Nov. 2, 2007.

(51) Int. Cl.
 *G06F 21/00* (2013.01)
 *G06F 21/79* (2013.01)
 *G06F 21/86* (2013.01)

(52) U.S. Cl.
 CPC ............... *G06F 21/79* (2013.01); *G06F 21/86* (2013.01)
 USPC ......................................................... 380/28

(58) Field of Classification Search
 CPC ............................... G06F 21/79; G06F 21/86
 USPC ...................................................... 380/28, 30
 See application file for complete search history.

(56) References Cited

U.S. PATENT DOCUMENTS

| | | | |
|---|---|---|---|
| 4,658,094 A * | 4/1987 | Clark ............................. | 380/28 |
| 5,499,299 A * | 3/1996 | Takenaka et al. ................ | 380/28 |
| 6,286,101 B1 * | 9/2001 | Suzuki ............................ | 726/34 |
| 6,381,699 B2 | 4/2002 | Kocher et al. | |
| 6,480,606 B1 | 11/2002 | Kurumatani | |
| 7,035,889 B1 | 4/2006 | Carlson et al. | |
| 7,174,015 B1 * | 2/2007 | Koc et al. ........................ | 380/28 |
| 7,564,971 B2 * | 7/2009 | Lee et al. ........................ | 380/30 |
| 2002/0136402 A1 * | 9/2002 | Vanstone ........................ | 380/30 |
| 2004/0167952 A1 * | 8/2004 | Gueron et al. ................. | 708/492 |
| 2004/0179681 A1 * | 9/2004 | Lee et al. ........................ | 380/30 |
| 2005/0198093 A1 | 9/2005 | Son | |

OTHER PUBLICATIONS

Maire McLoone, Ciaran McIvor, John McCanny, coarsely integrated operand scanning architecture for high-speed Montgomery Modular Multiplication, 2004, IEEE, ICEPT 2004, pp. 185-191.*

Hankerson, D. et al; Guide to Elliptic Curve Cryptography; 2004; p. 91; Chapter 3; Springer-Verlag, New York.

(Continued)

*Primary Examiner* — Hadi Armouche  
*Assistant Examiner* — Dao Ho  
(74) *Attorney, Agent, or Firm* — Etienne de Villiers; Dimock Stratton LLP

(57) ABSTRACT

A system and method configured for applying Montgomery style reduction directly to negative quantities as well as positive values, producing the new form which does not require conditional operations to move values into the positive range. The low-order components of the resulting product, or partially completed product, can be reduced either by the addition of multiples of the modulus, as is usual in the standard Montgomery multiplication which accepts positive values, or by subtracting multiples of the modulus, which of course depends on the actual computation. Signed versions of the Montgomery values in a Montgomery computation are used to avoid the conditional addition and subtraction that can leak information, for example, using a two's complement representation.

17 Claims, 1 Drawing Sheet

(56) References Cited

OTHER PUBLICATIONS

Hong, Jin-Hua et al.; "Radix-4 modular multiplication and exponentiation algorithms for the RSA public-key cryptosystem"; Design Automation Conference, 2000; pp. 565 to 570; Proceedings of the ASP-DAC 2000, Asia and South Pacific.

De Dormale, G.M. et al.; "An Improved Montgomery Modular Inversion Targeted for Efficient Implementation on FGPA"; Field-Programmable Technology, 2004; pp. 441 to 444; Proceedings of the 2004 IEEE International Conference on FGPA, Dec. 6-8, 2004.

Montgomery, P.; "Modular Multiplication Without Trial Division"; Mathematics of Computation; Apr. 1985; pp. 519 to 521; vol. 44, No. 177.

Shreih, R.; International Search Report from corresponding PCT Application No. PCT/CA2008/001887; Completed Feb. 12, 2009, received by Applicant Mar. 2, 2009.

EPO Communication pursuant to Article 94(3) EPC, Feb. 2, 2012.

Hachez G et al.: "Montgomery Exponentiation With No Final Subtractions: Improved Results", Ches 2000, LNCS 1965, Aug. 17, 2000, pp. 293-301, XP001049139, Springer-Verlag, Berlin, Germany; ISBN: 978-3-540-41455-1.

\* cited by examiner

US 8,781,112 B2

SIGNED MONTGOMERY ARITHMETIC

CROSS-REFERENCE TO RELATED APPLICATIONS

This application claims priority from U.S. Application No. 60/984,851 filed on Nov. 2, 2007, hereby incorporated by reference.

TECHNICAL FIELD

The following relates generally to Montgomery arithmetic and in particular provides Montgomery arithmetic utilizing signed quantities.

BACKGROUND

In cryptography, e.g. public key cryptography, operations such as multiplication or exponentiation of integers in some group $Z_n$ may be required, where modular arithmetic is used to operate on the integers. For example, to multiply two numbers modulo some n, the classical approach is to first perform the multiplication and then calculate the remainder. Although the classical approach is simple for basic operations such as in multi-precision calculations and does not require precomputation, the step of calculating the remainder is considered slow. The calculation of the remainder is referred to as reduction in modular arithmetic.

Modular reduction is often employed in cryptographic applications. Of the well known methods for modular reduction, the one most commonly used is the method of Montgomery modular reduction, referred to as Montgomery reduction in short. One way to avoid the expensive reduction in the classical approach is to use such Montgomery reduction, and thus the computation of modular reduction is often computed this way. Montgomery reduction benefits from the fact that steps of multiplication and shifting are generally faster than division on most computing machines. Montgomery reduction relies on performing certain precomputations and, by doing so, many calculations can be done faster. Also, as opposed to classical methods of reduction-from-above such as Euclidean division, Montgomery reduction reduces from below, that is, the method proceeds by clearing the least-significant portions of the unreduced quantity, leaving the remainder in the upper portion.

In Montgomery reduction, calculations with respect to a modulus n are carried out with the aid of an auxiliary number R called the Montgomery radix or base. When the modulus is a prime number, a good choice of radix is a power of two, typically chosen as the first convenient power of two larger than the modulus. In the following, the exponent of the power is denoted by L so that $R=2^L$. The Montgomery reduction of a number a with radix R and prime modulus n is the quantity given by $aR^{-1}$ mod n. The Montgomery multiplication of two numbers is the Montgomery reduction of their product, written as $a \otimes b = abR^{-1}$ mod n. Calculations are carried out on numbers in their Montgomery form. The Montgomery form of a number a is defined as $â=aR$ mod n. Conversion to Montgomery form may be carried out via Montgomery multiplication where $â=a \otimes R^2=aR$ mod n. Conversion from Montgomery form back to regular form may be carried out by Montgomery reduction: $âR^{-1}$ mod n=a mod n, or the Montgomery multiplication: $â \otimes 1=aRR^{-1}=a$ mod n.

The Montgomery exponentiation of a number is carried out via the usual square-and-multiply method, substituting Montgomery multiplication for the usual multiplication. As can be appreciated, efficiency may be increased by pre-computing certain fixed values to be used in the calculations. Such values include $\mu=(-n)^{-1}$ mod $2^w$, for some w typically being the bit size of a word (or block) of the value (or perhaps the entire value) being operated on and $R^2$ mod n.

In a given cryptographic system, a computational engine may be used for calculating the Montgomery product of two numbers, sometimes referred to as a Montgomery engine or Montgomery machine. The engine may be implemented in a hardware or software module and operates on a set of parameters to produce a result. For example, the engine may be used to produce the result $a \otimes b$ by inputting a and b. The Montgomery engine can be configured to also convert to and from Montgomery form. For converting to Montgomery form, the engine accepts a and $R^2$ as inputs and produces an output â. Conversely, for converting back to normal form, the engine accepts â and 1 as inputs and outputs a. The engine may also be configured to calculate the Montgomery reduction of a number. In this case, the engine accepts a and 1 as inputs and produces $aR^{-1}$ mod n as an output. To intialize the Montgomery engine, the engine is loaded with a modulus p and a radix R.

The use of Montgomery reduction to implement Montgomery multiplication is well known. There are many algorithms that can be used to perform the Montgomery multiplication. In one example, the Montgomery multiplication of two m-bit integers a and b in base $2^w$, reduced mod an m-bit integer n, where $a=(a_{m-1} \ldots a_1 a_0)$, $b=(b_{m-1} \ldots b_1 b_0)$, $n=(n_{m-1} \ldots n_1 n_0)$, and $0 \le a, b < n$, produces an output $abR^{-1}$ mod it. In this example, $R=2^L$ and $\mu=n^{-1}$ mod $2^w$ as above. In one exemplary algorithm, Montgomery multiplication may proceed as follows:

1. $A \leftarrow 0$, where Z is the result and $Z=(z_m z_{m-1} \ldots z_1 z_0)$
2. For i from 0 to (m-1) do the following:
  2.1 $u_i \leftarrow (z_0+a_i b_0)\mu$ mod $2^w$; and
  2.2 $Z \leftarrow (Z+a_i b+u_i n)2^w$.
3. If $Z \ge n$ then $Z \leftarrow Z-n$.
4. Return (Z).

In the above algorithm, it can be seen that a final comparison against the modulus and a conditional subtraction is performed, if the result is greater than or equal to the modulus. It will be appreciated that in performing an EC addition, a conditional addition may be performed. A side-effect of such a conditional subtraction is that information can be leaked to a side-channel analysis or attack, which is known to generally involve a process of exploiting some implementation aspect of a cryptographic algorithm such as sequential computational operations.

If Montgomery multiplication is to be used in elliptic curve computations, then the required operations may mix additions and subtractions alongside Montgomery multiplications and squarings. An example of such an elliptic curve operation is the EC point doubling formulae, which is defined in the Guide to Elliptic Curve Cryptography (Hankerson, Menezes, Vanstone) on page 91, Algorithm 3.21. A side-effect of these mixed additions and subtractions is a non-uniformity of operation to again reduce the results into the range required for Montgomery multiplication, which can possibly involve conditional additions or subtractions. For example, adding quantities can require subtraction of the modulus to reduce the value. Also, the subtractions of quantities can result in negative values. Typically, the modulus is added to such negative quantities to bring the modular result into the positive range. All of these conditional additions/subtractions can potentially leak information on the operands. Even if the operation is always performed, but the result is not always used (so called 'dummy' operations when not used), information can still potentially leak if the use or non-use can be detected.

It is therefore an object of the following to inhibit the above-mentioned side-channel attacks during Montgomery operations.

SUMMARY

It has been recognized that modifying Montgomery arithmetic to utilize signed quantities, allows for the computation of Montgomery arithmetic, in particular Montgomery multiplication, in particular for performing Montgomery multiplication mixed with modular additions and subtractions, to be implemented in a more uniform way and thus inhibit information leakage.

In one aspect, there is provided a method for performing Montgomery arithmetic in a cryptographic operation comprising representing operands in a Montgomery arithmetic operation as signed values; and operating on the signed values to produce a result for use in the cryptographic operation.

In another aspect, there is provided a computer readable medium for performing Montgomery arithmetic in a cryptographic operation comprising computer readable instructions for representing operands in a Montgomery arithmetic operation as signed values; and operating on the signed values to produce a result for use in the cryptographic operation.

In yet another aspect, the arithmetic operation is Montgomery multiplication.

In yet another aspect, the signed values are obtained by representing said operands in two's complement form.

In yet another aspect, there is provided a Montgomery machine comprising an arithmetic logic unit configured to operate on signed versions of Montgomery operands; a register file; and a controller, said controller being configured to load said signed versions of said Montgomery operands into said register and operate said arithmetic logic unit on said signed versions to produce a result.

BRIEF DESCRIPTION OF THE DRAWINGS

An embodiment of the invention will now be described by way of example only with reference to the appended drawings wherein.

DETAILED DESCRIPTION OF THE DRAWINGS

Figure 1:
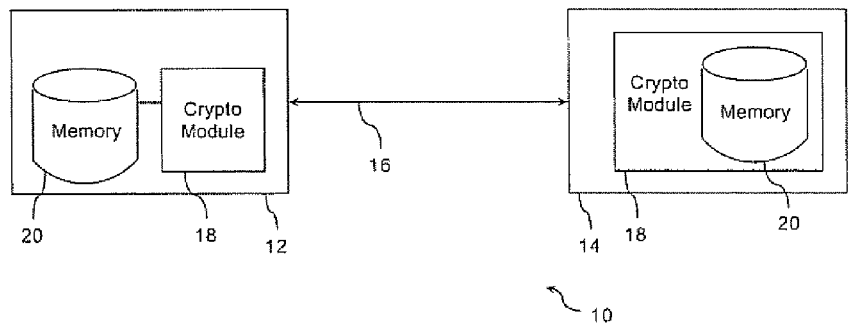
FIG. 1 is a schematic block diagram of a cryptographic communication system.

Referring now to FIG. 1, a cryptographic system 10 generally comprises a first correspondent 12 that communicates with a second correspondent 14 over a communication channel 16. Each correspondent includes a cryptographic module 18, which either has its own memory 20 for storing inputs, outputs and intermediate portions of cryptographic operations, or has access to an external memory 20 that is part of the correspondent (12, 14). It can be seen that in the example shown in FIG. 1, the first correspondent 12 includes a memory 20 external to the cryptographic module 18 and the second correspondent 14 includes memory 20 that is internal to the cryptographic module 18 to illustrate that the capability to store data can be provided in any suitable arrangement. It will also be appreciated that the memory 20 can be external to and accessible (e.g. via a network connection etc.) to the correspondent 12, 14 (not shown) if necessary or desired.

Figure 2:
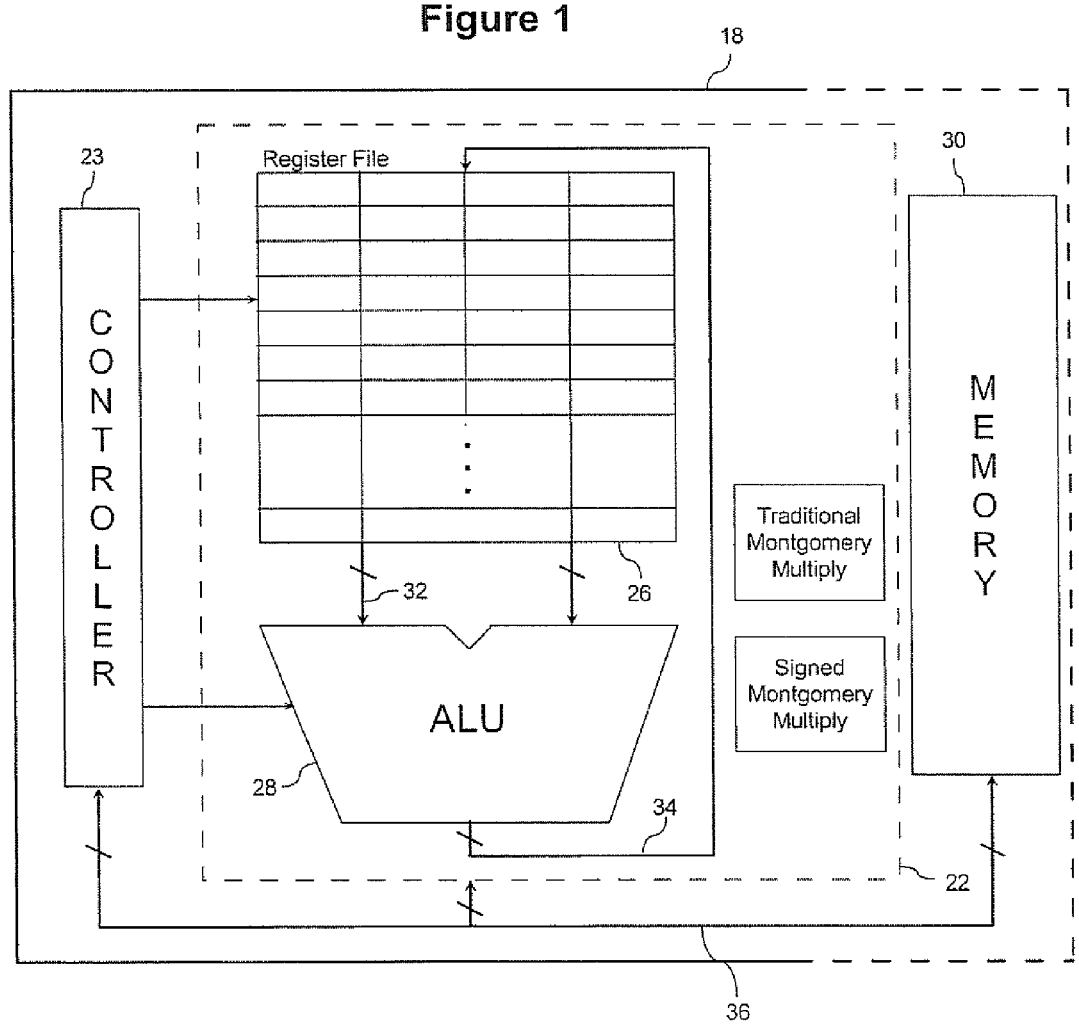
FIG. 2 is a schematic block diagram of any one or both of cryptographic modules shown in FIG. 1.

The cryptographic module 18 is configured to perform cryptographic operations such as encryption/decryption, signing and modular arithmetic, etc. In this example, the cryptographic module 18 is configured for performing elliptic curve cryptographic (ECC) operations, and includes a block Montgomery machine 22, further detail of which is shown in FIG. 2. It will be appreciated that the cryptographic module 18 and any component thereof may be implemented as an apparatus in either hardware or software (computer readable instructions embodied in/on a computer readable medium).

As can be seen in FIG. 2, the cryptographic module 18 includes a controller 24, the block Montgomery machine 22, and a memory 30. The machine 22 generally comprises a register file 26 and an arithmetic logic unit (ALU) 28.

The memory 30 may also be included in the machine 22 or be external to the machine 22 as illustrated. It will be appreciated that the memory 30 may comprise all or part of the memory 20 (shown in FIG. 1) or may be provided as a separate component in the cryptographic module 18 as shown. The memory 30 may include random access memory (RAM), read only memory (ROM) and/or any other type of suitable memory structure.

The register file 26 is a group of general purpose registers, which may be used as intermediate storage for cryptographic operations performed for and by the cryptographic module 18. The register file 26 communicates with the ALU 28 via data input buses 32. The ALU 28 comprises integer arithmetic circuitry. A data output or result bus 34 is provided from the ALU 28 to the register file 26 for writing results of computations performed in the ALU 28 to the register file 26.

Computational operations of the ALU 28 are controlled via programmed instructions residing in or accessible to the controller 24. A memory bus 36 is also provided to enable the controller 24 and the machine 22 to utilize memory 30 when performing and outputting results of the cryptographic operations. Typically, the machine 22 is utilized in an existing host computer system and the controller 23 receives control signals from the host system and communicates data to the register file 26 and ALU 28.

The general purpose registers that make up the register file 26 are made up of a certain number of blocks, each having a fixed length, e.g. 128 bits. As is well known in the art, the blocks are used to store data (operands, results etc.) during Montgomery computations.

It has been recognized that by providing and using a version of Montgomery arithmetic utilizing signed quantities, the computations can be performed in a more uniform way so as to not leak information to a side channel analysis. For example, using signed quantities allows for not only addition, but also subtraction to merely increase the bound of the magnitude of the quantities to be input to the Montgomery multiplication operation. Given bounds on initial quantities, addition or subtraction increases this bound by a single bit, assuming that reduction is not applied, which is important as the Montgomery algorithm is limited in the range of values it can handle by the Montgomery radix R that has been implemented. The operands will thus become larger as they are added or subtracted (again if reduction does not take place).

As will be discussed and shown below, the parameters of the Montgomery multiplication can be tailored to suit the bounds on the input operands, resulting in more uniform computations and thus not requiring the leakage prone expedient of conditional or dummy subtraction.

Firstly, the following illustrates how the requirement for positive inputs in traditional Montgomery multiplication can leak information about the operands.

The computation being performed in the following examples is $((\hat{a}-\hat{b})\otimes\hat{c} \mod n$, where the '^' indicates Montgomery form, $\otimes$ indicates a Montgomery multiplication operation, and n is the modulus. For this computation, the inputs to the Montgomery multiplier would be $(\hat{a}-\hat{b})$ and $\hat{c}$. It will be appreciated that this computation is for illustrative purposes only and that the following principles can be equally applied to other computations. In the following example, for ease of explanation, the modulus $n=2^{30}-1$. As outlined above, the Montgomery multiplication of two values a and b is obtained by performing the computation: $a\otimes b=abR^{-1} \mod n$, where R is the radix, which is typically chosen to be a power of 2, larger than n.

In this example, R may be chosen to be: R=232. To simplify the following explanation, hexadecimal notation will be used. As such, n 0x3FFFFFFF and R=0x100000000, '0x' being the typical computer language representation where the leading zero is used to recognize the value as a number and the 'x' is used to signify hexadecimal.

In this example: $\hat{a}$=0x2953F462, $\hat{b}$=0x33AA8952, and $\hat{c}$=0x1E349902.

Given the above values, the result obtained by computing the first part of the computation is: $\hat{a}-\hat{b}$=0xA5694F0, i.e. a negative value. To input this result to a traditional Montgomery multiplication operation, this value would require an addition to move the input $(\hat{a}-\hat{b})$ into the positive range. Often this is done by adding the modulus n to the negative value, namely where: $\hat{a}-\hat{b}+n$=0x35A96B0F. It can be seen that in order to condition the inputs for use in traditional Montgomery multiplication, a conditional operation is performed to determine if the value is negative and, if so, the conditional addition shown above is performed. This conditional addition can be problematic in that the presence of the conditional operation can leak information about the operands. For example, in a side-channel analysis, whenever the conditional addition is performed, the attacker may be able to ascertain that one of the inputs is a negative value, thus leaking information that can be used in an attack.

Once the conditional addition has been performed, the standard Montgomery multiplication of the two inputs (where $(\hat{a}-\hat{b})$ has been shifted to be positive) can proceed, since the inputs are both positive. The full multiplication (i.e. before reduction) is then;

$(\hat{a}-\hat{b}+n)*\hat{c}=$
0x35A96B0F*0x1E349902=0x654E1082D5ACD1E.

The product from the above computation requires the use of a cancelling multiple u, which in this example would be 0xAD5ACD1E (see step 2.1 above where $u_i$ represents a digit from the cancelling multiple u).

The cancelling multiple $u=(u_{m-1} \ldots u_1 u_0)$ is then used as follows:

$(\hat{a}-\hat{b}+n)*\hat{c}$+0xAD5ACD1E*n=0x31AB944F00000000 to zero the bottom bits for reduction.

The value 0x31AB944F00000000, when shifted down, produces the result;

$(\hat{a}-\hat{b}+n)\otimes\hat{c}$=0x31AB944F.

It is our observation that the cancellation of the low-order components of negative multiples is also a method of reduction, now in absolute value. In other words, it has been observed that Montgomery style reduction can be applied directly to negative quantities as well as positive values, producing the new form which does not require conditional operations to move values into the positive range. The low-order components of the resulting product, or partially completed product, can be reduced either by the addition of multiples of the modulus, as is usual in the standard Montgomery multiplication which accepts positive values, or by subtracting multiples of the modulus, which of course depends on the actual computation.

From the above observations, it has been recognized that signed versions of the Montgomery values in a Montgomery computation can be used to avoid the conditional addition and subtraction that can leak information. The above example, namely Montgomery multiplication will be used to illustrate how the signed version obtains the same result without the conditional operations although it will be appreciated that the signed Montgomery values can be used in any Montgomery operation performed by the Montgomery machine 22.

As there are many ways to represent negative integer quantities, e.g. one's compliment, two's complement etc., there are many ways to represent the Montgomery values as signed values. Since the most ubiquitous of the techniques is the two's compliment approach, the following example will illustrate the effectiveness of using signed Montgomery values using a two's complement representation.

As computed above, the value $\hat{a}-\hat{b}$=−0xA5694F0 is a negative value. If the two's compliment of this value is computed, the value would be: $\hat{a}-\hat{b}$=0xF5A96B10, where the sign bits have extended the value to 32 bits, To illustrate the conversion, the decimal representation can be examined:

$(\hat{a}-\hat{b})_{decimal}$=693367906−866814290=−173446384,
which in hexadecimal would be −A5694F0 as before. To take the two's complement, first consider the binary representation of value A5694F0, which is: 0000 1010 0101 0110 1001 0100 1111 0000, with the four leading zeros indicating it is a negative value.

To take the two's complement, each bit is inverted and a one (1) added to the inverted value, namely: 1111 0101 1010 1001 0110 1011 0000 1111+1=
1111 0101 1010 1001 0110 1011 0001 0000.

When converting this two's complement value in binary back into hexadecimal, the result is F5A96B10 where the F indicates that it is a signed value.

The two's complement or signed version of $(\hat{a}-\hat{b})$ can be directly input into a signed-capable version of a Montgomery multiplication routine. A signed-capable Montgomery multiplication is a version wherein the multiplications consider quantities to be signed. That is, the values a, b, Z (not the individual digits) are considered to be signed quantities. The signed capable version does not need to perform the conditional subtraction shown above in the context of the traditional Montgomery multiplication. As a result, the signed-capable Montgomery multiplication operation computes:

$(\hat{a}-\hat{b})\otimes\hat{c}$=0xF5A96B100$\otimes$0x1E349902=0x31AB944F,
which as shown above in the traditional Montgomery operation, is the correct result.

The signed-capable Montgomery operation would be implemented by including two's complement architecture in the cryptographic unit 18 so that the controller 23 performs the arithmetic with a two's complement signed representation and then perform a normal Montgomery multiplication on the positive values, which does not require a conditional subtraction at the end. As shown in FIG. 2, the machine 22 can store a traditional Montgomery multiply routine but more importantly, has a signed version of Montgomery multiply that does not include the conditional subtraction. The operation would be performed by obtaining the signed versions of the operands, initiate the signed Montgomery multiply routine and use this routine to operate on the signed operands Again, if the signed versions are in two's complement, the cryptographic unit 18 would include architecture to represent values in the two's complement form.

As a more realistic example, another computation that could be performed is $(\hat{a}-\hat{b})\otimes\hat{c} \mod p$, where $\otimes$ is the Montgomery multiplication, and $p=2^{224}*(2^{32}-1)+2^{192}+2^{96}-1$ (i.e. a prime used for the NIST ECC standard).

Then, if.

$\hat{a}$=0xFDF45D5F6C24293B5DB473EF2344D12DA153C6B6FD9DDE10E9E3401-F45EAD3A6;

$\hat{b}$=0xFF2BEC9B6C491FE9BEF159874BCBC8EA3D5F386A750B52D38B7-81339F66C5765E; and $\hat{a}$=160x60AC2031CA11CC7BOC7232B22CB9FC9DC011C42C70F54-32353F8739D3AC91FAE then;

$\hat{a}-\hat{b}$=0x178F3C0024F6AE613CE5982886F7BC9COB-71B3776D74C7CD9DF38020DAA2B8;

which would require an addition to move the value to the positive range, similar to the example above. If this value is instead represented in two's complement, (where the FF . . . FF denotes sign extension to the top of the representation), $\hat{a}-\hat{b}$ would be represented as:

$\hat{a}-\hat{b}$=0xFF . . . FFEC870C3FFDB09519EC31A67-D779084363F48-E4C88928B3832620C7FDF255D48

This result could be directly input into the signed-capable version of Montgomery multiply mentioned above, i.e. a version lacking any final conditional subtraction.

This results in:

$(\hat{a}-\hat{b})\otimes\hat{c}$=0x5AEBE0E982B09295A55C72-5B0AE23F4E415F5EE87CDBAD67CB3F1752026201E2;

which is the correct result.

It can therefore be seen that Montgomery style reduction can be applied directly to negative quantities as well as positive values, producing the new form which does not require conditional operations to move values into the positive range. The low-order components of the resulting product, or partially completed product, can be reduced either by the addition of multiples of the modulus, as is usual in the standard Montgomery multiplication which accepts positive values, or by subtracting multiples of the modulus, which of course depends on the actual computation.

From the above observations, it has been recognized that signed versions of the Montgomery values in a Montgomery computation can be used to avoid the conditional addition and subtraction that can leak information, for example, using a two's complement representation.

Although the invention has been described with reference to certain specific embodiments, various modifications thereof will be apparent to those skilled in the art without departing from the spirit and scope of the invention as outlined in the claims appended hereto.

The invention claimed is:

1. A method for performing Montgomery arithmetic in a cryptographic operation executed on a Montgomery machine, said method implementing said Montgomery arithmetic in a uniform fashion to improve the resistance of said Montgomery machine to side-channel cryptographic attacks, said method comprising a processor of said Montgomery machine:
   selecting one of traditional Montgomery multiplication or signed capable Montgomery multiplication, according to an instruction;
   when the signed capable Montgomery multiplication is selected, the method comprising:
   representing operands in a Montgomery arithmetic operation as signed values;
   operating on said signed values using a signed-capable Montgomery arithmetic operation to produce a signed intermediate result;
   adjusting a Montgomery radix R of a signed-capable Montgomery multiplication operation to suit a bound of input operands comprising said signed intermediate result and another operand;
   operating on said input operands using said signed-capable Montgomery multiplication as tailored to suit said bound of said input operands; and,
   producing a result for use in said cryptographic operation.

2. The method according to claim 1 wherein said signed values are obtained by representing said operands in two's complement form.

3. The method according to claim 1 wherein said signed values are obtained by representing said operands in one's complement form.

4. The method according to claim 1 comprising executing a signed-capable Montgomery operation stored in said Montgomery machine to instruct said Montgomery machine to operate using said signed values.

5. The method of claim 1, further comprising using said signed capable Montgomery multiplication when a traditional Montgomery multiplication would require a conditional operation; and, using said traditional Montgomery multiplication when said conditional operation is not required.

6. The method of claim 1 wherein said bound of said input operands is larger than a bound of said signed values.

7. A non-transitory computer readable medium, for execution on a computing device to perform Montgomery arithmetic in a cryptographic operation in a uniform fashion to improve the resistance of said computing device to side-channel cryptographic attacks, comprising computer readable instructions to cause said computing device to:
   select one of traditional Montgomery multiplication or signed capable Montgomery multiplication, according to an instruction;
   when the signed capable Montgomery multiplication is selected, the instructions cause the computing device to:
   represent operands in a Montgomery arithmetic operation as signed values;
   operate on said signed values using a signed-capable Montgomery arithmetic operation to produce a signed intermediate result; and,
   adjust a Montgomery radix R of a signed-capable Montgomery multiplication operation to suit a bound of input operands comprising said signed intermediate result and another operand;
   operate on said input operands using said signed capable Montgomery multiplication as tailored to suit said bound of said input operands, to produce a result for use in said cryptographic operation.

8. The non-transitory computer readable medium according to claim 7 wherein said signed values are obtained by representing said operands in two's complement form.

9. The non-transitory computer readable medium according to claim 7 wherein said signed values are obtained by representing said operands in one's complement form.

10. The non-transitory computer readable medium according to claim 7 comprising instructions for executing a signed-capable Montgomery operation stored in a Montgomery machine to instruct said Montgomery machine to operate using said signed values.

11. The computer readable medium of claim 7 further operative to use said signed capable Montgomery multiplication when a traditional Montgomery multiplication would require a conditional operation; and, to use said traditional Montgomery multiplication when said conditional operation is not required.

12. The computer readable medium of claim 7 wherein said bound of said input operands is larger than a bound of said signed values.

13. A Montgomery machine comprising:
an arithmetic logic unit configured to operate on signed versions of Montgomery operand values;
a register file; and,
a controller, said controller being configured to:
load said signed values of said Montgomery operands into said register;
operate said arithmetic logic unit on said signed values using Montgomery arithmetic to produce an intermediate result;
adjust a Montgomery radix R of a signed-capable Montgomery multiplication operation to suit a bound of input operands comprising said signed intermediate result and another operand; and,
operate on said input operands using said signed capable Montgomery multiplication as tailored to suit said bound of said input operands, to produce a result;
wherein said an arithmetic logic unit is further configured to perform traditional Montgomery multiplication, and wherein controller being further configured to select either said signed capable Montgomery multiplication using said signed values, or said traditional Montgomery multiplication, according to an instruction.

14. The Montgomery machine according to claim 13 wherein said signed values are obtained by representing said operands in two's complement form.

15. The Montgomery machine according to claim 13 wherein said signed values are obtained by representing said operands in one's complement form.

16. The Montgomery machine according to claim 13, wherein said selection selects said signed capable Montgomery multiplication when said traditional Montgomery multiplication would require a conditional operation.

17. The Montgomery machine according to claim 13 wherein said bound of said input operands is larger than a bound of said signed values.

* * * * *